(12) United States Patent
Kondo (10) Patent No.: US 7,753,419 B2
(45) Date of Patent: Jul. 13, 2010

(54) MOUNTING STRUCTURE FOR VEHICLE CRASH SENSOR

(75) Inventor: Shunji Kondo, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 12/104,900

(22) Filed: Apr. 17, 2008

(65) Prior Publication Data

US 2009/0001759 A1 Jan. 1, 2009

(30) Foreign Application Priority Data

Jun. 27, 2007 (JP) ............................. 2007-168922
Jan. 22, 2008 (JP) ............................. 2008-011696

(51) Int. Cl.
*B60R 19/02* (2006.01)

(52) U.S. Cl. ................. 293/117; 180/274; 200/61.45 R (58) Field of Classification Search ................. 293/117; 180/274; 200/61.45, 61.45 R
See application file for complete search history.

(56) References Cited

U.S. PATENT DOCUMENTS

| | | | | |
|---|---|---|---|---|
| 3,774,938 A | * | 11/1973 | Orlando ...................... | 280/735 |
| 3,853,199 A | * | 12/1974 | Hirashima et al. .......... | 180/274 |
| 4,397,372 A | * | 8/1983 | De Kraker .................. | 180/277 |
| 5,192,838 A | * | 3/1993 | Breed et al. ........... | 200/61.45 R |
| 5,281,780 A | | 1/1994 | Haland | |
| 5,314,229 A | * | 5/1994 | Matuzawa et al. ..... | 296/187.09 |
| 5,934,703 A | * | 8/1999 | Mimura et al. .............. | 280/734 |
| 6,039,367 A | * | 3/2000 | Muller et al. ................ | 293/117 |
| 6,318,774 B1 | * | 11/2001 | Karr et al. ................... | 293/117 |
| 6,340,187 B1 | * | 1/2002 | Villiere et al. .............. | 293/155 |
| 6,460,648 B2 | * | 10/2002 | Kleinberg ................... | 180/282 |
| 6,572,161 B2 | * | 6/2003 | Wild et al. .................. | 293/117 |
| 7,207,410 B2 | * | 4/2007 | Song et al. .................. | 180/274 |
| 7,357,431 B2 | * | 4/2008 | Sato et al. ................... | 293/117 |
| 7,384,082 B2 | * | 6/2008 | Blake ......................... | 293/117 |
| 2005/0092061 A1 | * | 5/2005 | Takafuji et al. ............ | 73/12.09 |
| 2007/0027584 A1 | * | 2/2007 | Hau et al. ....................... | 701/1 |
| 2008/0122231 A1 | * | 5/2008 | Schinke et al. ............. | 293/117 |

FOREIGN PATENT DOCUMENTS

| | | |
|---|---|---|
| DE | 19621964 A1 | 12/1997 |
| EP | 1457390 A1 | 9/2004 |
| EP | 1775173 A2 | 4/2007 |
| EP | 1889753 A2 | 2/2008 |
| JP | 2005147991 | 6/2005 |
| JP | 2007-83846 * | 4/2007 |

OTHER PUBLICATIONS esp@cenet patent abstracts of Japan publication No. 2005147991, published Jun. 9, 2005 (2 pages).

(Continued)

*Primary Examiner*—Dennis H Pedder
(74) *Attorney, Agent, or Firm*—Osha • Liang LLP (57) ABSTRACT

A sensor assembly of a vehicle includes a substantially horizontal protrusion secured to a body portion of the vehicle and extending therefrom in a direction of an impact input and a crash sensor mounted to the substantially horizontal protrusion, wherein the crash sensor is configured to detect an impact force applied to the body panel by the impact input.

20 Claims, 10 Drawing Sheets

OTHER PUBLICATIONS

Office Action in Chinese Patent Applicaiton No. 2008101261431, issued Dec. 25, 2009, and English translation thereof (16 pages).
Patent Abstract of JP2007083846 form esp@cenet, published Apr. 5, 2007 (1 page).
English Patent Abstract of EP1775173 from esp@cenet, published Apr. 18, 2007 (1 page).
English Patent Abstract of EP1457390 from esp@cenet, published Sep. 15, 2004 (1 page).
English Patent Abstract of DE19621964 from esp@cenet, published Dec. 18, 1997 (1 page).
English Patent Abstract of EP1889753 from esp@cenet, published Feb. 20, 2008 (1 page).
European Search Report for European Application No. 08158728.9-2421, mailed Mar. 26, 2010 (6 pages).

* cited by examiner

MOUNTING STRUCTURE FOR VEHICLE CRASH SENSOR

CROSS-REFERENCE TO RELATED APPLICATIONS

The present application claims priority from Japanese Patent Application No. 2007-168922, filed Jun. 27, 2007, and Japanese Patent Application No. 2008-011696, filed Jan. 22, 2008. Both priority Applications are hereby incorporated by reference herein in their entirety.

BACKGROUND OF THE DISCLOSURE

1. Field of the Disclosure

The present disclosure relates to a mounting structure of a vehicle crash sensor.

More particularly, the present disclosure relates to a vehicle crash sensor mounted to a body cover exposed to the outside of a vehicle to detect an impact upon the body cover.

2. Description of the Related Art

An example of a sensor that detects an impact input to a front bumper of a vehicle may be found in Japanese Unexamined Patent Application Publication No. 2005-147991.

The Application discloses a film-like sensor provided along an inner (back) surface of a front bumper.

However, as disclosed, where the impact-detecting sensor is located (i.e., along the inner surface of the front bumper), the surface of the front bumper has low rigidity, Therefore, the flexibility of the front bumper inner surface may make it difficult to transmit impact energy, thereby degrading the sensitivity of the sensor.

SUMMARY OF THE CLAIMED SUBJECT MATTER

In one aspect, embodiments of the present disclosure relate to a sensor assembly of a vehicle including a substantially horizontal protrusion secured to a body portion of the vehicle and extending therefrom in a direction of an impact input and a crash sensor mounted to the substantially horizontal protrusion, wherein the crash sensor is configured to detect an impact force applied to the body panel by the impact input.

In another aspect, embodiments of the present disclosure relate to a sensor assembly for a vehicle body panel including a protrusion means for extending away from the vehicle body panel in a substantially horizontal direction and a sensor means for detecting an impact force applied to the vehicle body panel, wherein the sensor means is mounted to the protrusion means.

In another aspect, embodiments of the present disclosure relate to a method to mount an impact sensor to a vehicle body panel including mounting the impact sensor to a substantially rigid protrusion of the vehicle body panel and extending the protrusion substantially horizontally from a surface of the vehicle body panel in a direction of an anticipated impact input.

In another aspect, embodiments of the present disclosure relate to a mounting structure for a vehicle impact sensor including a body panel comprising a substantially rigid protrusion extending from a surface of the body panel in a direction of an anticipated impact input and a mounting bracket attached to the protrusion, the mounting bracket configured to retain the vehicle impact sensor, wherein the mounting structure is such that when an impact force is applied to an outer portion of the body panel in the direction of the anticipated impact input, the impact force is transmitted through the protrusion and the mounting bracket to the impact sensor.

BRIEF DESCRIPTION OF DRAWINGS

Features of the present disclosure will become more apparent from the following description in conjunction with the accompanying drawings.

DETAILED DESCRIPTION

Embodiments of the present disclosure are described below with reference to the drawings.

Figure 1:
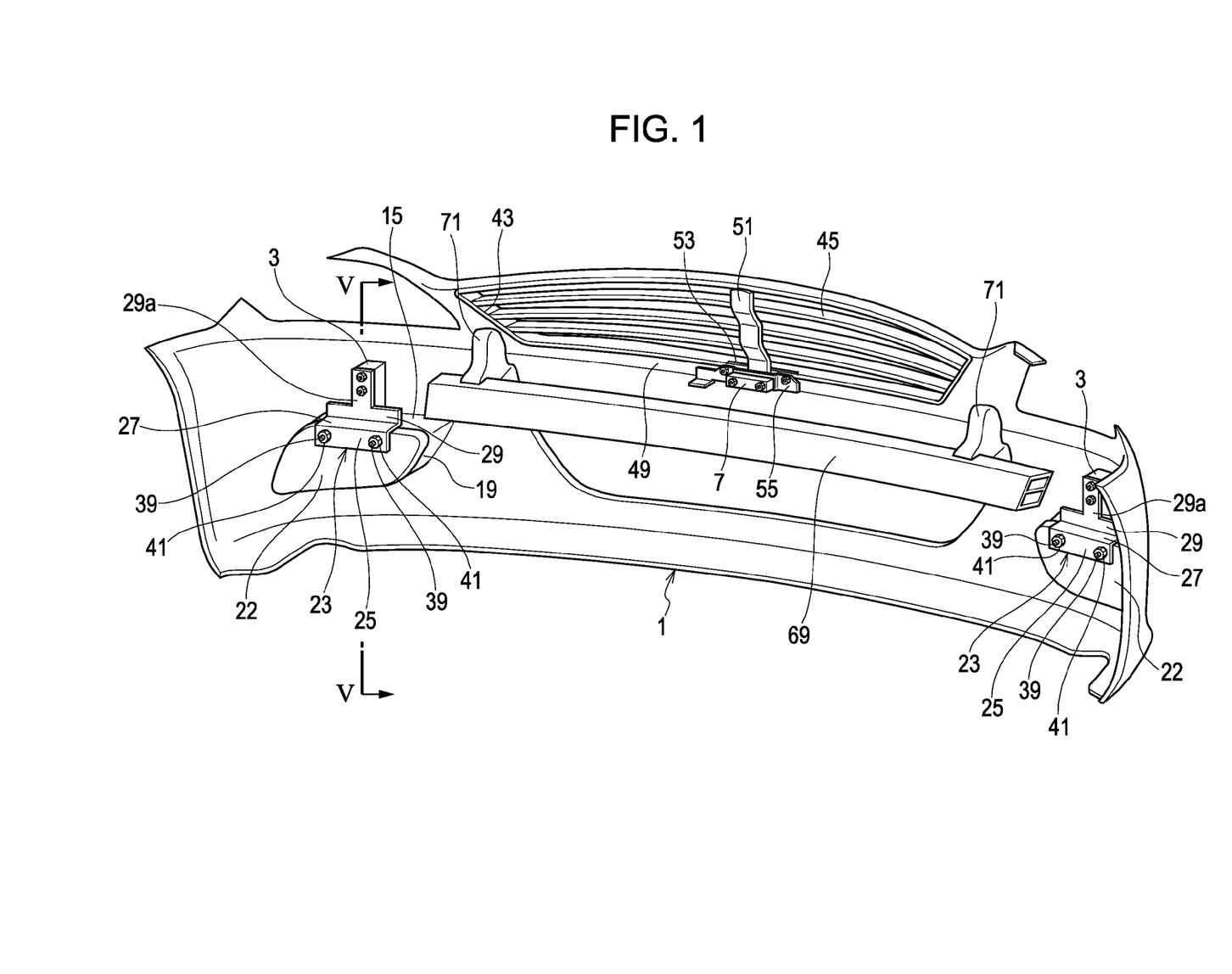
FIG. 1 is a perspective view showing an exemplary embodiment of the present disclosure, viewed from the rear side of a front bumper of an automobile.
Figure 2:
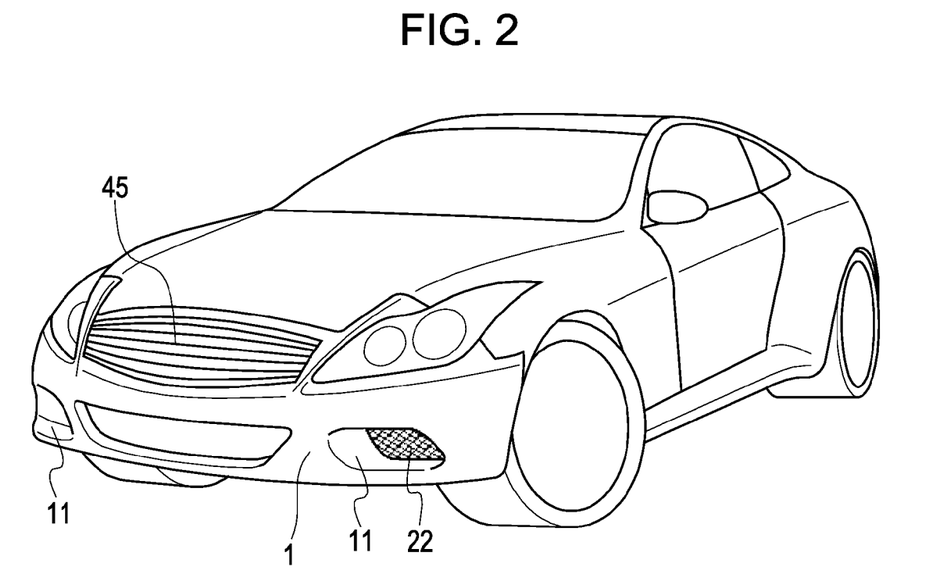
FIG. 2 is a perspective view showing an automobile having the front bumper of FIG. 1.
Figure 3:
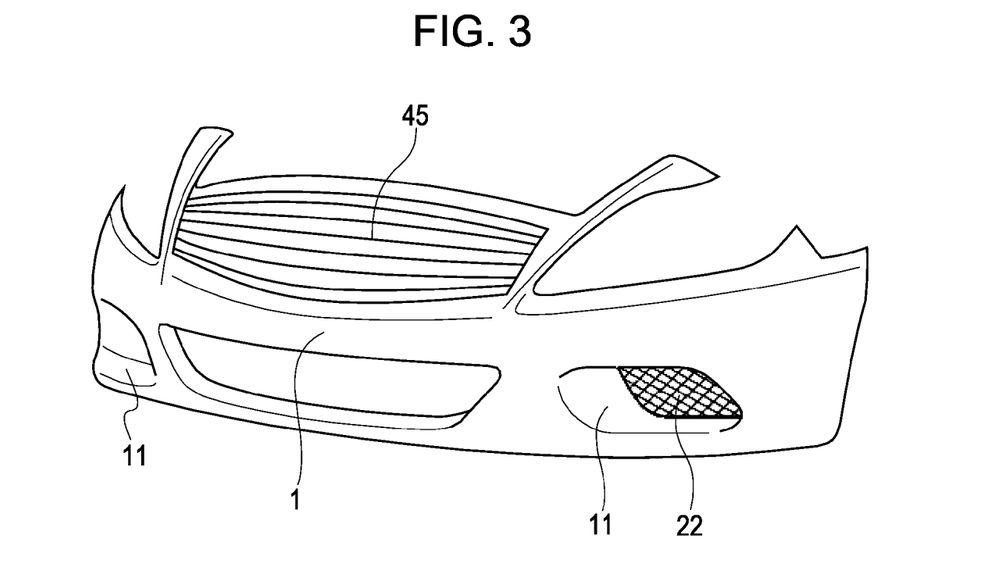
FIG. 3 is a perspective view showing the front side of the front bumper of FIG. 1.

FIG. 1 is a perspective view showing an exemplary embodiment of the present disclosure, viewed from the back side (i.e., from the rear) of a front bumper 1 provided at a front portion of a vehicle (e.g., the automobile shown in FIG. 2). FIG. 3 is a perspective view showing front bumper 1, viewed from the front side of the vehicle. Front bumper 1 comprises a body panel covering the front side of the vehicle that is exposed to the outside of the vehicle.

As shown in FIG. 1, at the back surface of front bumper 1, side sensors 3 are provided at portions near both ends in the vehicle width (i.e., transverse) direction, and a center sensor 7 is provided at a center portion in the vehicle width direction. Sensors 3 and 7 may be vehicle crash sensors capable of detecting an impact to front bumper 1 in the vehicle front-rear (i.e., longitudinal) direction.

Figure 4A:
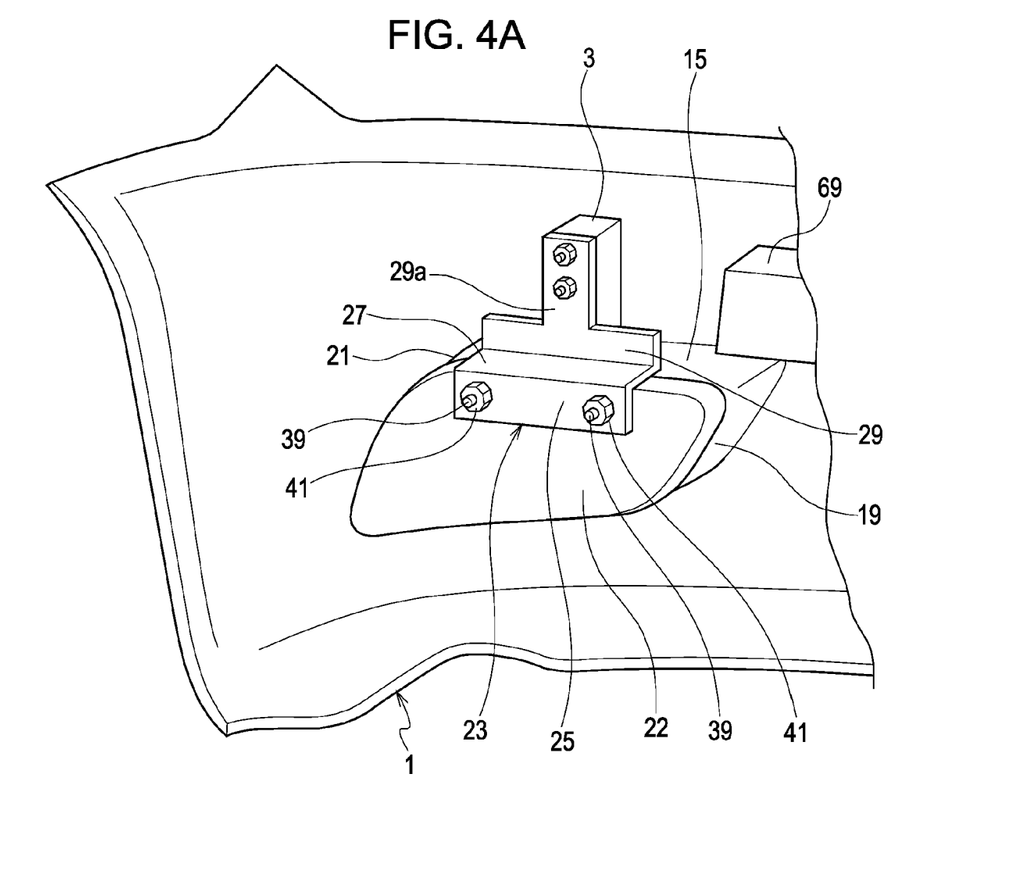
FIG. 4A is an enlarged perspective view showing a mount for a side sensor shown in FIG. 1.
Figure 4B:
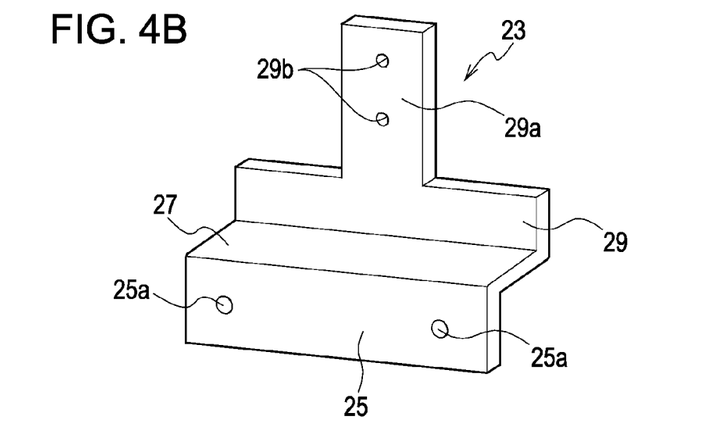
FIG. 4B is a perspective view showing a sensor bracket of the mount of FIG. 4A.
Figure 5A:
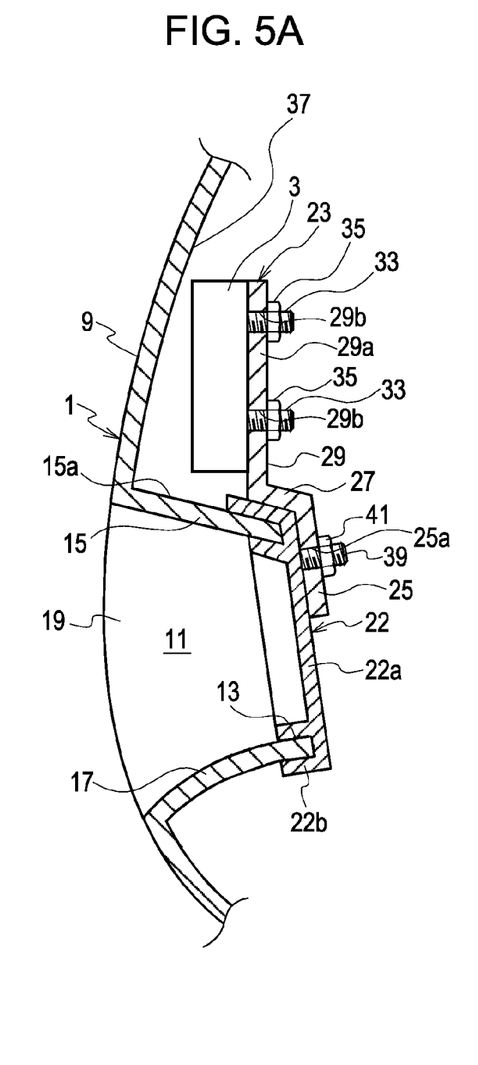
FIG. 5A is a cross section showing the mount of the side sensor of FIG. 1, taken along line V-V.

FIG. 4A is an enlarged perspective view showing a mount for side sensor 3, FIG. 4B is a perspective view showing a sensor bracket 23 (described later) as a mounting tool. FIG. 5A is a cross section showing the mount taken along line V-V in FIG. 1, when viewed from a lateral side of the vehicle.

As shown in FIG. 5A, front bumper 1 comprises in its surface 9 a through hole 11. Through hole 11 may be defined by an upper wall 15, a lower wall 17, and side walls 19 and 21. Upper wall 15 may extend in the vehicle front-rear direction or, an impact input direction. An opening 13 is defined by ends of walls 15, 17, 19 and 21, located near the rearward end of through hole 1 of front bumper 1.

Upper wall 15 may be slightly inclined so that an end near the rearward side (i.e., The right side as shown in FIG. 5A) of front bumper 1 is positioned vertically lower than an end nearest the front. Lower wall 17 may be curved so that an end nearest the front the vehicle is located vertically lower than an end located near the rearward side and so that lower wall 17 may be bulged toward through hole 11. As shown in FIG. 1, side walls 19 and 21 may be inclined so that their upper ends are positioned closer to the center of the vehicle in the width direction than their lower ends.

At opening 13 of through hole 11, a decorative member 22 may be attached from the rear side of the vehicle to fill opening 13. Decorative member 22 may include a plate-like blocking portion 22a and a securing portion 22b. Blocking portion 22a covers opening 13. Securing portion 22b may extend along the entire outer peripheral edge of blocking portion 22a and may protrude toward the front side of the vehicle. Securing portion 22b may "sandwich" the ends of walls 15, 17, 19, and 21 to secure them by frictional grabbing or the like.

The attaching of securing portion 22b to walls 15, 17, 19, and 21 may be performed, for example, by bonding with an adhesive, instead of simple frictional grabbing.

Each of side sensors 3 may be mounted to the portion provided with through hole I 1 at the back surface of front bumper 1, using sensor bracket 23 as the mounting tool. Sensor bracket 23 may include a pressure receiving wall 25 as a pressure receiving portion, a horizontal wall 27 as a mounting tool extending portion, and a vertical wall 29. Pressure receiving wall 25 may be fixed to an upper portion of the rear surface of decorative member 22 provided at the through hole 11. Horizontal wall 27 may extend from the upper end of pressure receiving wall 25 along an upper surface of securing portion 22b toward the front side of the vehicle. Vertical wall 29 may extend from a front end of horizontal wall 27 toward the vertical upper portion of front bumper 1. Side sensor 3 may be mounted to a surface of vertical wall 29 near the front side of front bumper 1 of the vehicle.

As shown in FIG. 4A or 4B, an upper portion of vertical wall 29 may have a width narrower than that of a lower portion and may define a neck 29a located near the center of sensor bracket 23. Side sensor 3 may be mounted to neck 29a.

Vertical wall 29 (including neck 29a) may comprise mounting holes 29b. Side sensor 3 may comprise bolts 33 to be inserted through mounting holes 29b and fastened with nuts 35, In the alternative, mounting structure of side sensor 3 to vertical wall 29 (including neck 29a) may use clips, rivets, welds, adhesives, or any mechanism known to those having ordinary skill to attach sensor 3.

With such a mounting condition, side sensor 3 may be longitudinally spaced from a back surface 37 of front bumper 1. Furthermore, side sensor may be spaced apart from an upper surface 15a of upper wall 15 and from securing portion 22b of decorative member 22 in a vertical direction generally orthogonal to the longitudinal direction.

Pressure receiving wall 25 of sensor bracket 23 may comprise mounting holes 25a. Blocking portion 22a of decorative member 22 may also comprise stud bolts 39 protruding toward the rear side of the vehicle. Stud bolts 39 may be inserted through mounting holes 25a, and fastened with nuts 41. Accordingly, sensor bracket 23 may be mounted to the front bumper 1.

Figure 5B:
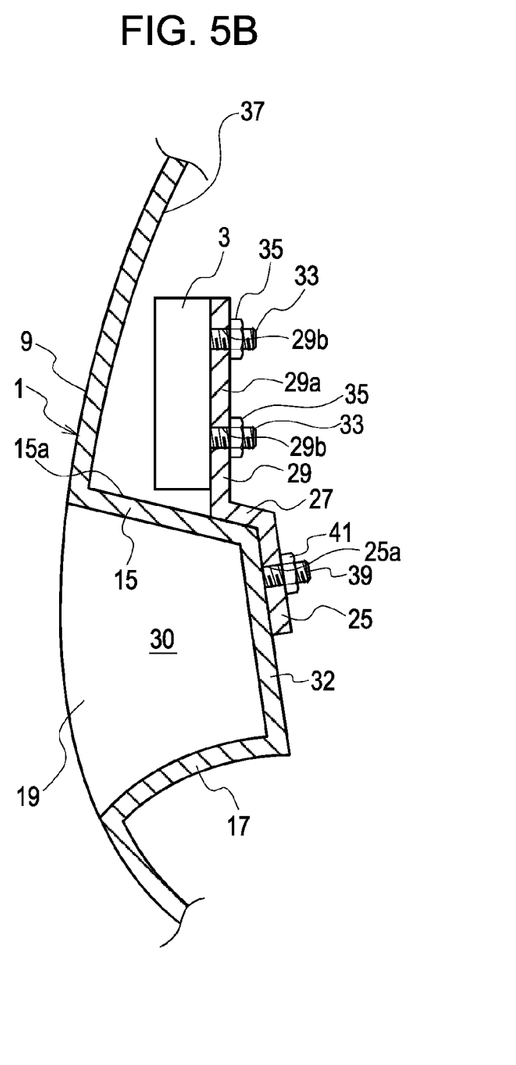
FIG. 5B is a cross section showing a modification of FIG. 5A.

As shown in FIG. 5B, a recess 30 may be provided in front bumper 1 instead of through hole 11 in FIG. 5A. As such, sensor bracket 23 may be mounted to a bottom wall 32 at the rear of recess 30 in a manner similar to the mounting of bracket 23 to decorative member 22 shown in FIG. 5A. In this case, horizontal wall 27 of sensor bracket 23 may extend along upper surface 15a of upper wall 15 toward the front side of the vehicle.

Figure 6:
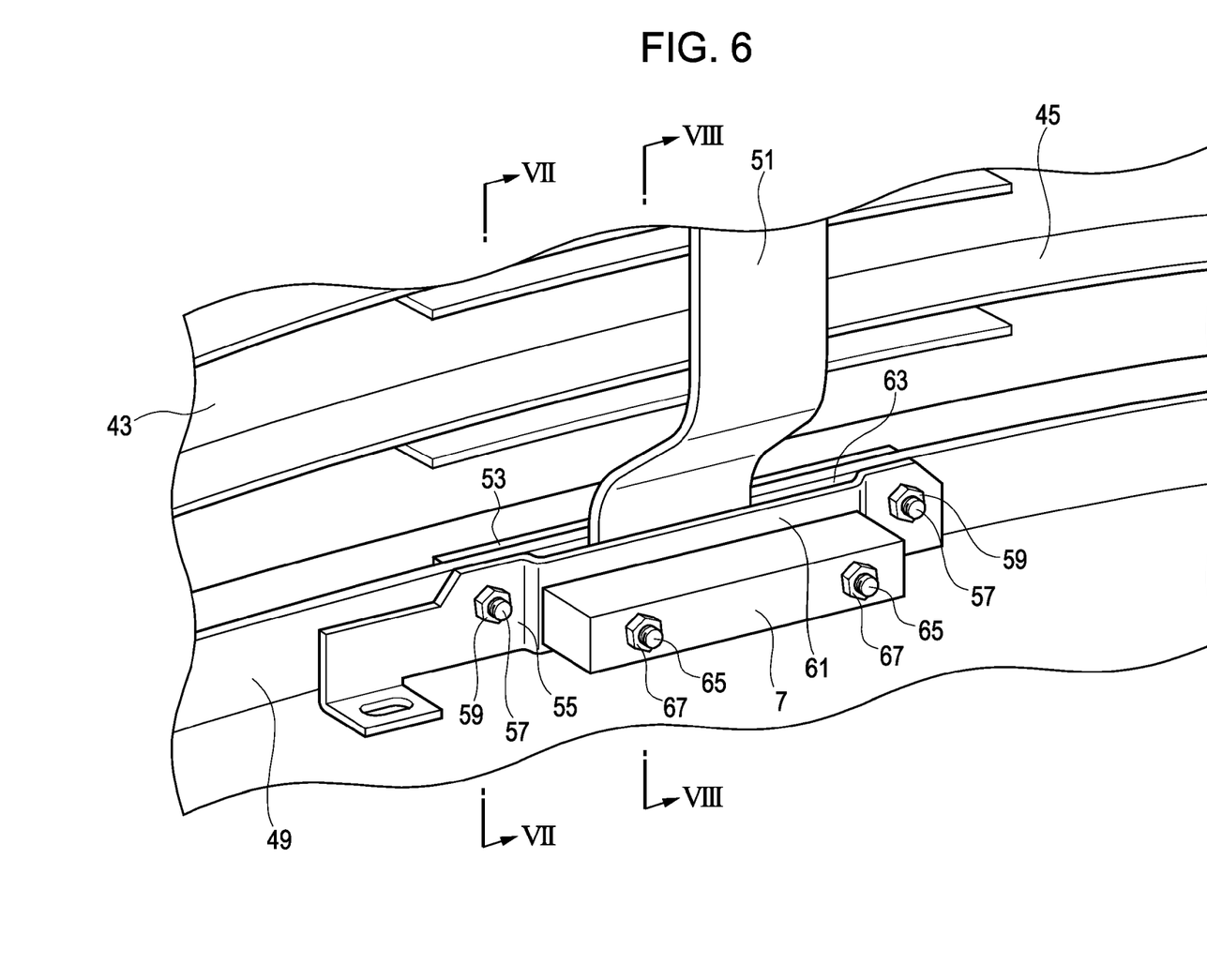
FIG. 6 is an enlarged perspective view showing a mount for a center sensor shown in FIG. 1.
Figure 7:
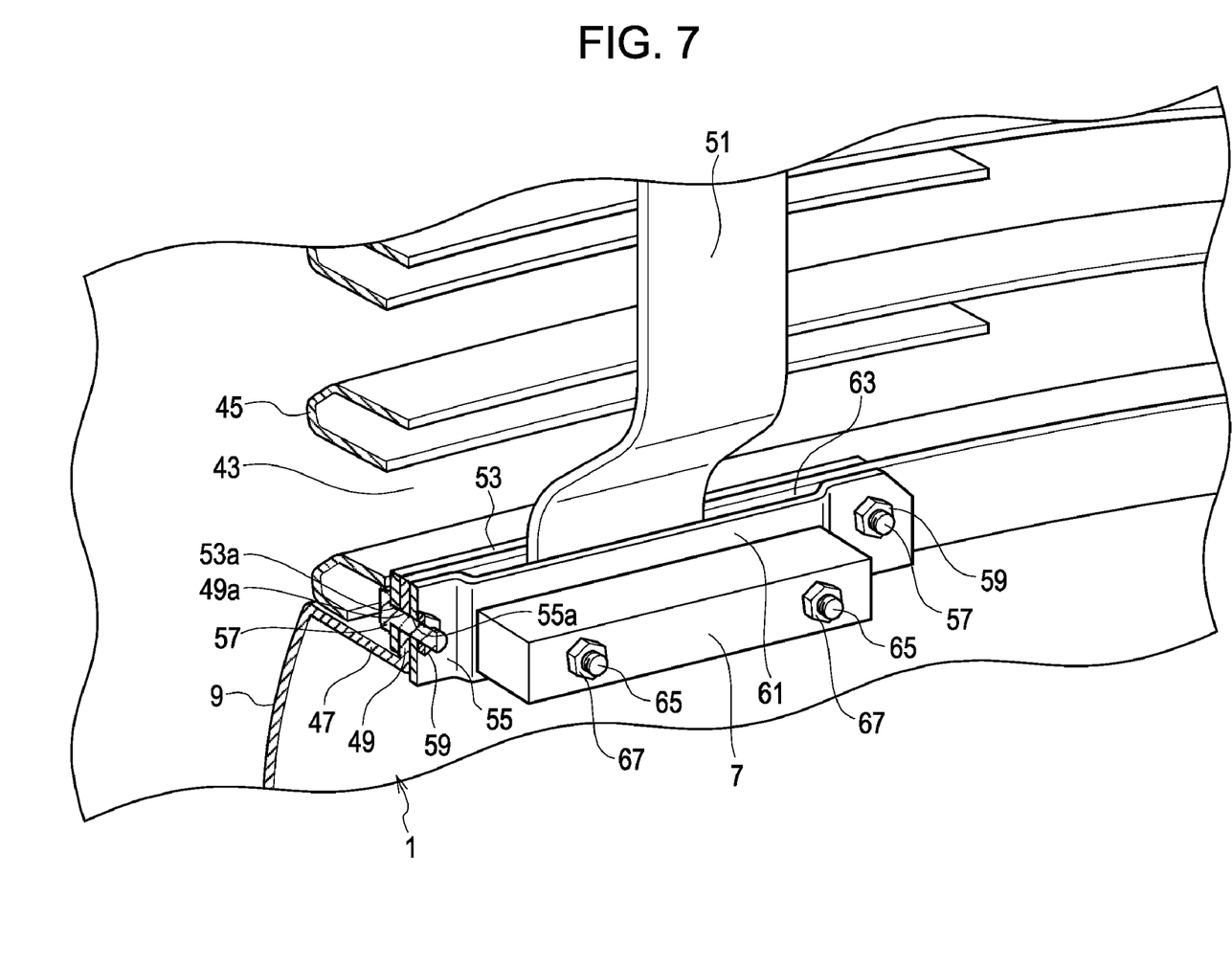
FIG. 7 is a fragmentary sectioned, perspective view taken along line VII-VII of FIG. 6.
Figure 8:
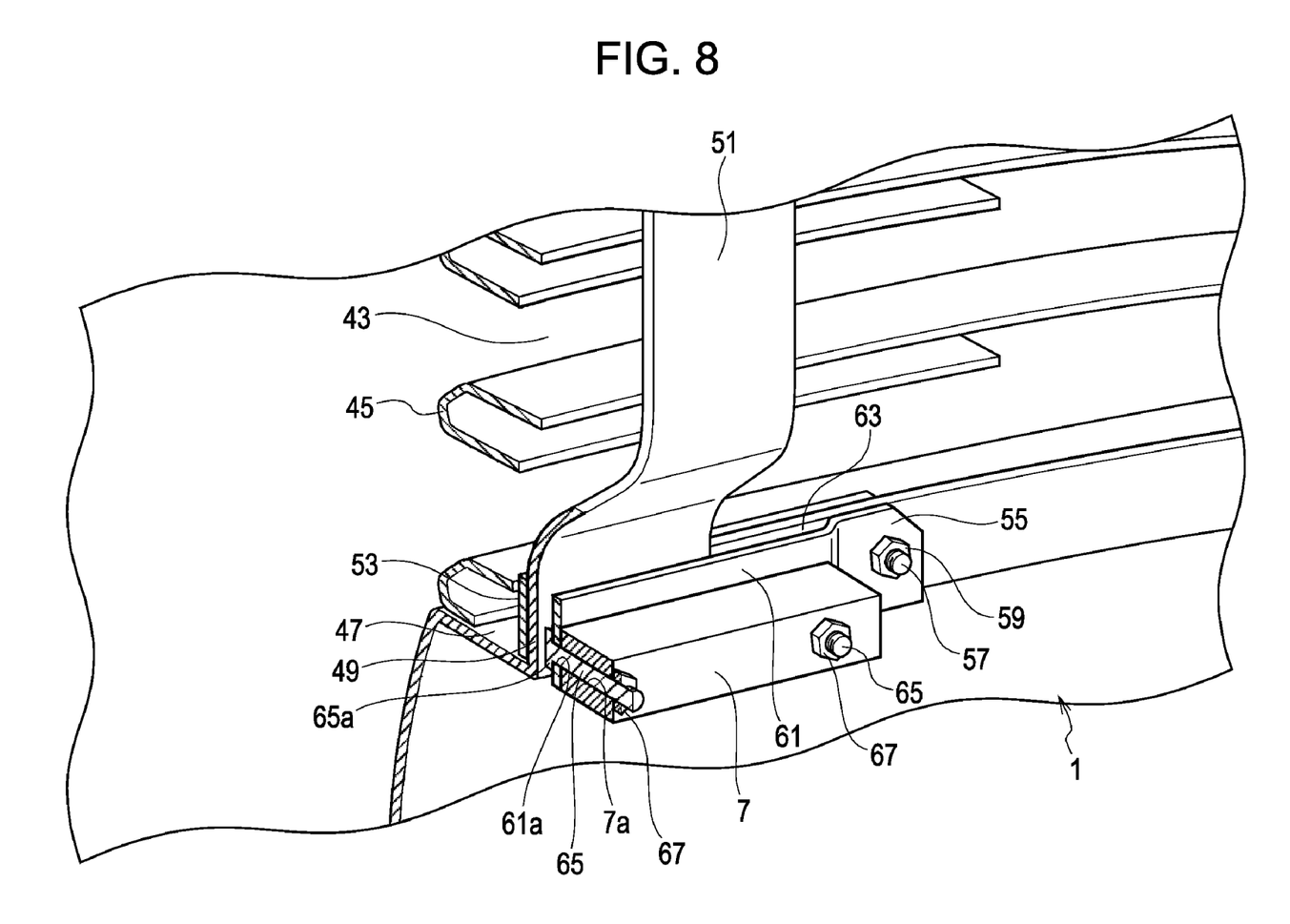
FIG. 8 is a fragmentary sectioned, perspective view taken along line VIII-VIII of FIG. 6.

Referring again to FIG. 1, center sensor 7 may be mounted to a lower portion near a center of a radiator grill 45 in the vehicle width direction. Radiator grill 45 may be mounted to an upper opening 43 of front bumper 1. FIG. 6 is an enlarged perspective view showing the mounting position. FIGS. 7 and 8 are fragmentary sectioned, perspective views, taken along lines VII-VII and VIII-VIII, respectively.

As shown in FIGS. 7 and 8, upper opening 43 may be provided with a lower edge wall 47 extending toward the rear side of the vehicle, so as to fix radiator grill 45 thereto in upper opening 43 of front bumper 1 in FIG. 1. A vertical wall 49 may be formed by bending and may continuously extend upward from a rear end of lower edge wall 47.

A supporting arm 51 may be located at the center of the vertical wall 49 in the vehicle width direction at a location corresponding to mounted center sensor 7, and may extend from an upper end of vertical wall 49. Supporting arm 51 may be bent toward the rear of the vehicle and may then be bent upward.

A pair of sensor brackets 53 and 55 as mounting tools may be mounted to "sandwich" vertical wall 49 at the bottom of supporting arm 51 from the front and rear sides such that supporting arm 51 is positioned in the middle of the "sandwich." In a selected embodiment, sensor brackets 53 and 55 may be attached prior to attaching radiator grill 45 to upper opening 43. In particular, as shown in FIG. 7, bolts 57 may be inserted from the front side of the vehicle to bolt insertion holes 53a, 55a, and 49a of sensor brackets 53, 55 and vertical wall 49 at two positions located in the vehicle width direction. Then, bolts 57 may be fastened with nuts 59 from the rear side of the vehicle.

Sensor bracket 55 located near the rear side of the vehicle may comprise a bulged portion 61. Bulged portion 61 may be formed by bending a center portion in the vehicle width direction toward the rear side of the vehicle so as to protrude with respect to both ends in the vehicle width direction, wherein the end portions may be fixed to vertical wall 49 with bolts 57. Accordingly, a clearance 63 may be provided between the sensor bracket 55 and the vertical wall 49.

Center sensor 7 may be mounted to a surface of bulged portion 61 of sensor bracket 55, located near the rear side of the vehicle. As shown in FIG. 8, bolts 65 may be inserted from a back side of bulged portion 61 (i.e., from the clearance 63 to bolt insertion holes 61a of the bulged portion 61) and then through holes 7a of center sensor 7 at two positions in the vehicle width direction. Bolts 65 may be fastened with nuts 67 from the rear side of the vehicle. At this time, the height of heads 65a of the bolts 65 may be accommodated in clearance 63.

Accordingly, center sensor 7 may be mounted to lower edge wall 47 near the rear side of front bumper 1, using sensor brackets 53 and 55. Lower edge wall 47 may comprise the extending portion of the front bumper 1.

In selected embodiments, center sensor 7 may be fixed to sensor bracket 55 first as described above and then, the pair of sensor brackets 53 and 55 may be mounted to vertical wall 49.

As shown in FIG. 1, a bumper reinforcement 69 may extend in the vehicle width (i.e., transverse) direction and be mounted to a back surface of the front bumper I, using brackets 7 1, as reinforcing members, at portions near both ends in the vehicle width direction. The above-described side and center sensors 3 and 7 may be arranged at positions not superposed by bumper reinforcement 69 in the vehicle front-rear (i.e., longitudinal) direction. That is, the vehicle crash sensor may be arranged at a position deviated from bumper reinforcement 69 in a direction intersecting with the vehicle front-rear direction, which is the impact input direction.

Next, an example situation is described in which an impact is input to front bumper 1 from the front side of the vehicle as would be experienced during a frontal crash with side and center sensors 3 and 7 mounted to front bumper 1 as described above.

If an impact is input to the front bumper 1 from the front side of the vehicle during a frontal crash of the automobile depicted in FIG. 2, left and right side sensors 3 and center sensor 7 may detect the force of impact as a variation in acceleration. Then, a controller (not shown) may receive an input of the detection signal, and may operate controls in response, for example, to deploy an air bag, forcibly retract a seat belt, or forcibly open a hood.

As shown in FIG. 5A or 5B, side sensor 3 may be mounted to upper wall 15 of front bumper 1 using decorative member 22 and sensor bracket 23. Accordingly, if the impact is input to front bumper 1 from the front side of the vehicle upon a frontal crash of the automobile, the impact may be transmitted to side sensor 3 though upper wall 15 having a higher rigidity than that of surface 9 extending along front bumper 1. Hence, the impact energy may be more easily transmitted to side sensor 3 compared to a structure where side sensor 3 is mounted directly to surface 9 of front bumper 1. As a result, the sensitivity of the sensor may be increased.

As shown in FIGS. 7 and 8, center sensor 7 may be mounted to vertical wall 49 using sensor brackets 53 and 55, wherein vertical wall 49 continuously extends from the rear end of lower edge wall 47. As such, lower edge wall 47 may have a higher rigidity against an impact from the front side than surface 9 of front bumper 1. As a result, the sensitivity of the sensor may be further increased.

Additionally, side sensor 3 may be spaced apart from upper wall 15 (extending portion) in a vertical direction. Accordingly, the impact input to upper wall 15 may be amplified by a distance between side sensor 3 and upper wall 15 through an impact force moment. As a result, the sensitivity of the sensor may be further increased.

Further, side sensor 3 may be mounted to upper wall 15 using sensor bracket 23. Sensor bracket 23 may have pressure receiving wall 25 located at an end of upper wall 15 opposite surface 9 of front bumper 1 and extending in a direction intersecting with upper wall 15. Accordingly, pressure receiving wall 25, which may be substantially perpendicular to upper wall 15, may receive the impact input to upper wall 15 having a high rigidity. Thus, the impact may be efficiently transmitted from pressure receiving wall 25 to side sensor 3.

Side sensor 3 may be mounted to upper wall 15 using sensor bracket 23. Sensor bracket 23 may have horizontal wall 27 as the mounting tool extending portion which extends along upper wall 15. Accordingly, even when the impact input to pressure receiving wall 25 is insufficient because upper wall 15 may flutter when impacted, horizontal wall 27 may receive the fluttering, thereby reliably transmitting the impact to side sensor 3.

Side sensor 3 may be spaced apart from back surface 37 of front bumper 1 in the vehicle front-rear direction, or the impact input direction. Accordingly, even when back surface 37 of front bumper 1 located near the front side of the vehicle with respect to the side sensor 3 is moved rearward by a certain distance because of a force other than impact (e.g., wind vibration, or being hit by a foreign object including stones, etc.), back surface 37 may not come into contact with side sensor 3, thereby preventing a false impact detection.

Side and center sensors 3 and 7 may be arranged at positions not superposed with bumper reinforcement 69 of front bumper 1 on the rear side of the vehicle in the vehicle front-rear direction. Side and center sensors 3 and 7 may be prevented from coming into contact with bumper reinforcement 69 when the impact is input, and the impact may be correctly detected with side and center sensors 3 and 7.

Figure 9A:
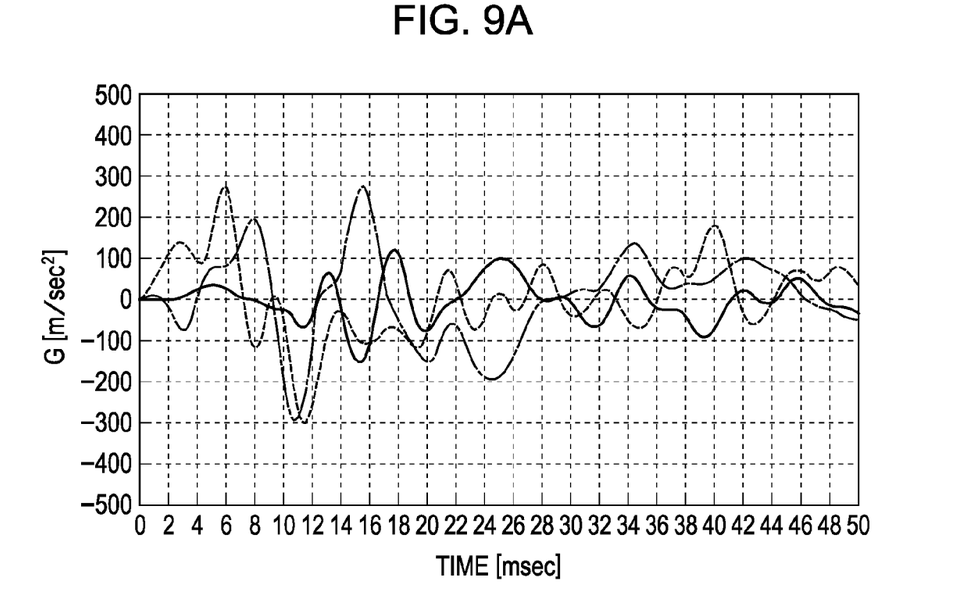
FIGS. 9A and 9B are waveform charts, FIG. 9A plotting sensor outputs when an impact is input according to an embodiment of the present disclosure, FIG. 9B plotting sensor outputs when an impact is input if a sensor is directly mounted to the surface (back surface) of a front bumper.

Referring now to FIG. 9A, a plot of sensor outputs (in m/sec$^2$) of left and right side sensors 3 and center sensor 7 structurally mounted in accordance with embodiments described herein are depicted following impact. In contrast, FIG. 9B depicts a plot of sensor outputs when sensors are directly mounted to a surface (e.g., the back surface) of a front bumper.

Figure 9B:
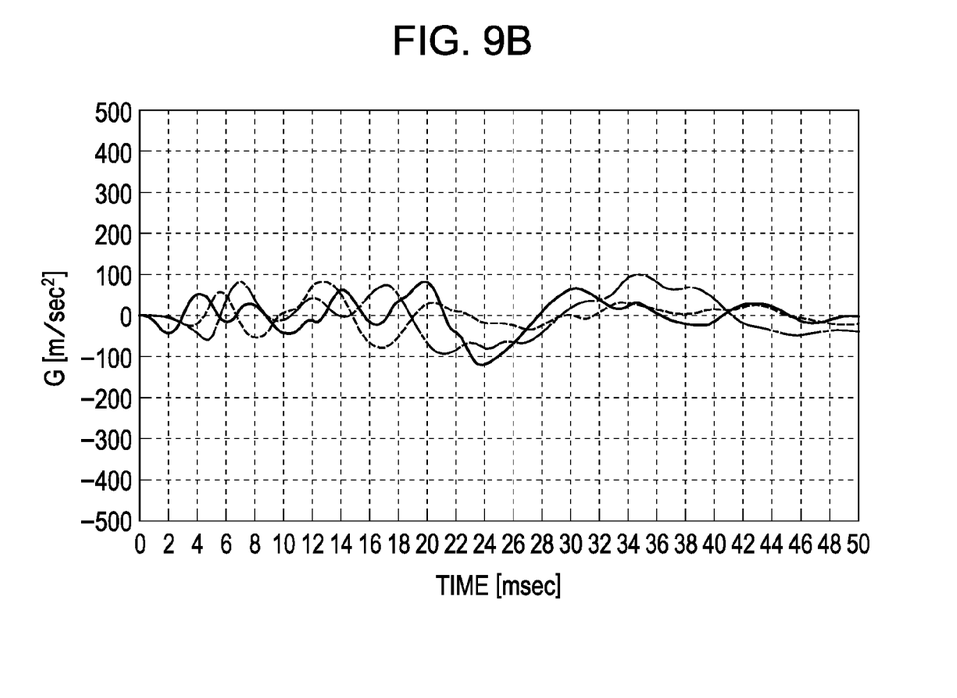

In FIGS. 9A and 9B, the solid line represents a left side sensor (e.g., 3) and the broken line represents a right side sensor (e.g., 3) when viewed from the front side of the vehicle and the dashed-dotted-chain line represents a center sensor (e.g., 7).

Referring to FIG. 9A, the waveform of the right side sensor 3 (broken line) and the waveform of the center sensor 7 (dashed-dotted-chain line) noticeably vary immediately following impact and the waveform of the left side sensor 3 (solid line) varies slightly after the variations of the right side and center sensors. In contrast, referring to FIG. 9B, the entire waveforms are smooth even at the time immediately following impact. Thus, the sensor mounting structure in accordance with embodiments disclosed herein may provide a sensor having higher sensitivity.

Figure 10:
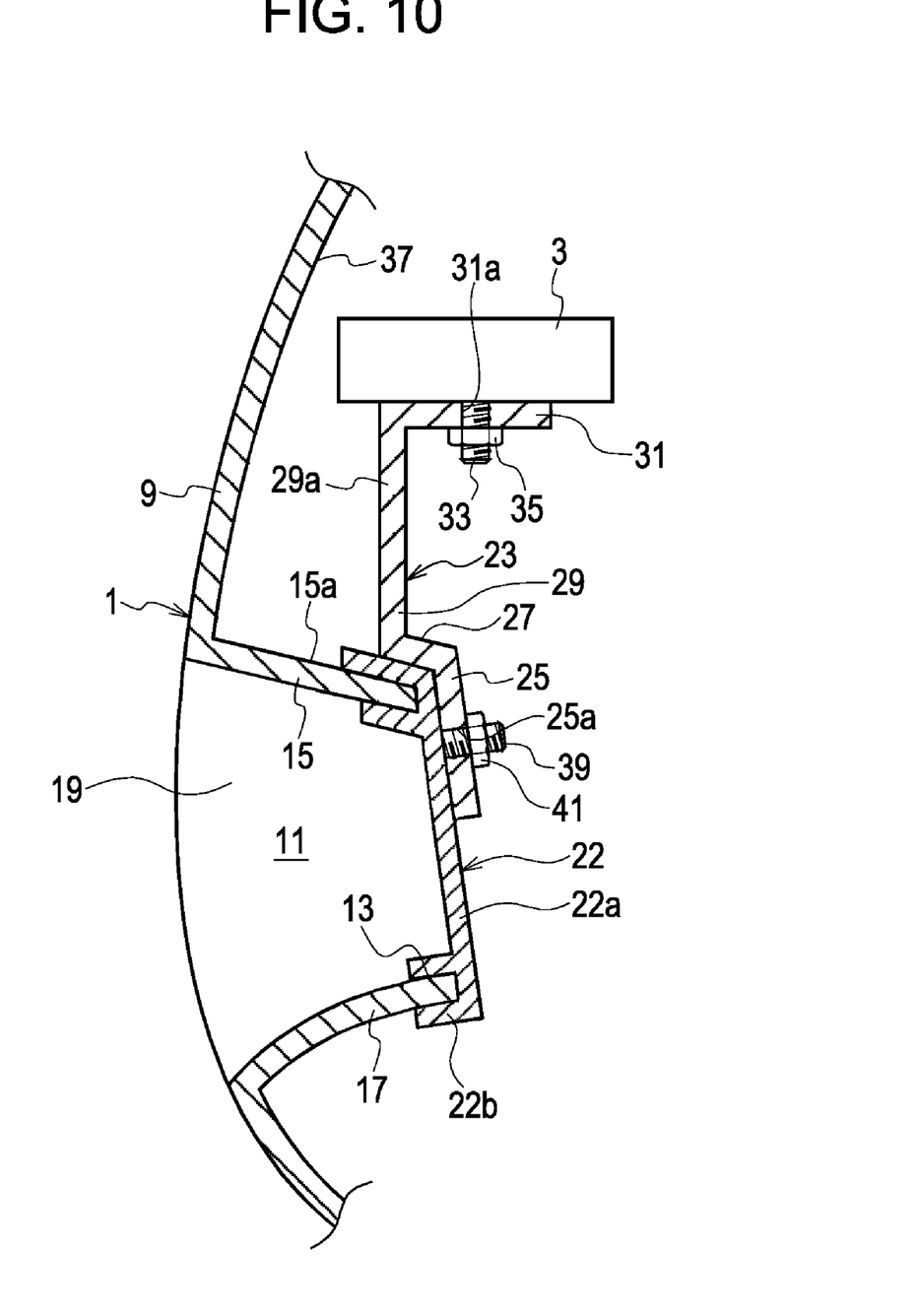
FIG. 10 is a cross section showing a first alternative embodiment of the present disclosure in a view similar to that shown in FIG. 5A.

Referring now to FIG. 10, a cross-sectional view depicting a first alternative embodiment in accordance with the present disclosure is shown in a view similar to that of FIG. 5A. The embodiment of FIG. 10 differs from the embodiment shown in FIG. 5A in that the sensor mounting portion at the upper portion of sensor bracket 23 has a different shape. In FIG. 10, like numerals refer like components as in FIG. 5A.

Sensor bracket 23 includes a sensor mounting wall 31 extending from an upper end of vertical wall 29 toward the rear side of the vehicle. Sensor mounting wall 31 includes mounting holes 31a. Bolts 33 of side sensor 3 may be inserted through mounting holes 31a, and fastened with nuts 35 in a manner similar to that shown in FIG. 5A.

In this embodiment, side sensor 3 may be positioned on the upper surface of sensor bracket 23 instead of being positioned on a front surface of sensor bracket 23. Thus, similar advantages may be obtained.

Figure 11:
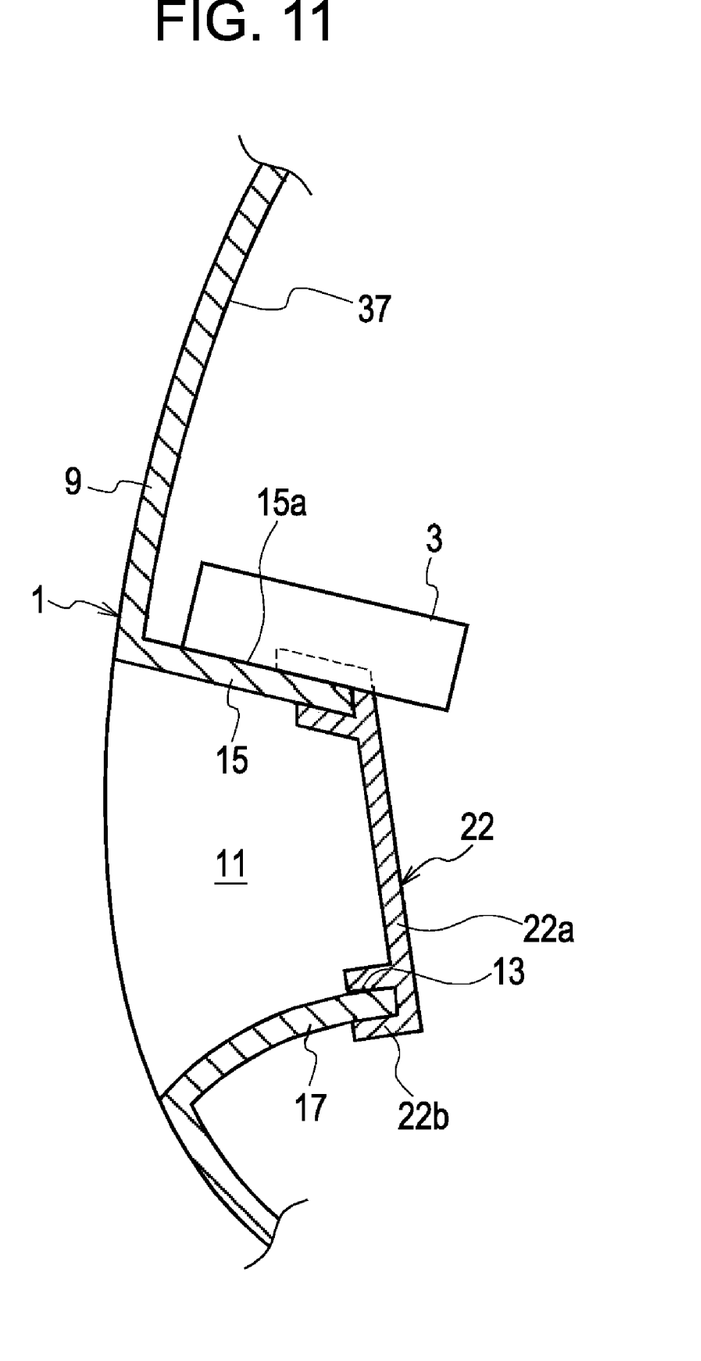
FIG. 11 is a cross section showing a second alternative embodiment of the present disclosure in a view to that shown in FIG. 5A.

Referring now to FIG. 11, a cross-sectional view depicting a second alternative embodiment in accordance with the present disclosure is shown in a view similar to that of FIG. 5A. The embodiment of FIG. 11 differs from the embodiment shown in FIG. 5A in that side sensor 3 is shown mounted directly to upper surface 15a of upper wall 15. Side sensor 3 may be mounted using bolts and nuts, clips, tacks, welds, adhesives, or by any bonding mechanism known to those having ordinary skill.

Because side sensor 3 may be directly mounted at upper wall 15, an upper end portion of decorative member 22 as well as securing portion 22b corresponding to side sensor 3 may be omitted. Alternatively, side sensor 3 may be mounted at securing portion 22b.

In this embodiment, because side sensor 3 may be mounted to upper wall 15 having high rigidity, the impact energy may be transmitted to side sensor 3 more easily. This arrangement may increase the sensitivity of the sensor.

Advantageously, side sensor 3 may be spaced apart from back surface 37 of front bumper 1 in the vehicle front-rear (or impact input or longitudinal) direction. Accordingly, even when front bumper 1 located near the front side of the vehicle with respect to side sensor 3 is moved rearward by a certain distance because of a force other than impact (e.g., wind vibration, or being hit by a foreign object including stones, etc.), back surface 37 would not come into contact with side sensor 3, thereby preventing a false impact detection.

Further, side sensor 3 may be arranged at a position not superposed with bumper reinforcement 69 provided at front bumper 1 on the rear side of the vehicle, in the vehicle front-rear direction, or the crash direction. Side sensor 3 may be prevented from coming into contact with bumper reinforcement 69 when the impact is input so that the force of impact may be correctly detected with side sensor 3.

It should be understood that in the embodiments of FIGS. 10 and 11, through hole 11 as depicted in FIG. 5A may be replaced by recesses 30 as depicted in FIG. 5B.

Furthermore, even in circumstances where decorative member 22 is not attached to through hole 11 of front bumper 1 (e.g., when a component such as a fog light is installed), side sensor 3 may be still mounted directly to an upper wall of the component, or indirectly thereto using a sensor bracket.

In the above-described embodiments, while the impact is input to the vehicle upon the frontal crash (i.e., the impact is input to front bumper 1 toward the rear of the vehicle), it should be understood that embodiments disclosed herein should not limited thereto. Even when an impact is input from the rear side of the vehicle through a rear bumper upon a back crash, or from the lateral side of the vehicle upon a side crash, the sensitivity of the sensor may be increased by applying the mounting arrangement of side sensor 3 as depicted in embodiments disclosed herein. In particular, the mounting arrangements of either FIG. 5A or FIG. 5B to position the sensor to the inside of a body panel of the vehicle, may be applied where the body panel is provided at a rear or a side of the vehicle, where the body panel is to the outside of the vehicle.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A sensor assembly of a vehicle, the sensor assembly comprising:
   a bumper cover;
   a protrusion connected to the bumper cover and extended from inner surface of the bumper cover in a direction of an impact input; and
   a crash sensor mounted to the protrusion;
   wherein the crash sensor is configured to detect an impact force applied to the bumper cover by the impact input.

2. The sensor assembly of claim 1, wherein the crash sensor is mounted to the protrusion through a mounting bracket.

3. The sensor assembly of claim 2, wherein the mounting bracket comprises a pressure receiving portion located at an end of the protrusion opposite an inner surface of the bumper cover; and the pressure receiving portion extends in a direction intersecting with the protrusion.

4. The sensor assembly of claim 2, wherein the mounting bracket extends along the protrusion.

5. The sensor assembly of claim 1, wherein the bumper cover comprises a bumper reinforcement at a vehicle interior side of the bumper cover, wherein the bumper reinforcement is the protrusion.

6. A sensor assembly of a vehicle, the sensor assembly comprising:
   a bumper;
   a protrusion connected to the bumper and extended from inner surface of the bumper in a direction of an impact input; and
   a crash sensor mounted to the protrusion;
   wherein the crash sensor is configured to detect an impact force applied to the bumper by the impact input,
   wherein the bumper comprises a through hole defined by a wall portion, and the protrusion is a part of the wall of the through hole.

7. A sensor assembly of a vehicle, the sensor assembly comprising:
   a bumper;
   a protrusion connected to the bumper and extended from inner surface of the bumper in a direction of an impact input; and
   a crash sensor mounted to the protrusion;
   wherein the crash sensor is configured to detect an impact force applied to the bumper by the impact input,
   wherein the bumper comprises a lower edge wall extending toward the rear side of the vehicle so as to fix a radiator grill, and the protrusion is the lower edge wall.

8. The sensor assembly of claim 1, wherein the protrusion exists at plural positions of the bumper cover, and plural crash sensors are mounted at each protrusion.

9. The sensor assembly of claim 6, wherein the crash sensor is mounted to the protrusion through a mounting bracket.

10. The sensor assembly of claim 9, wherein the mounting bracket comprises a pressure receiving portion located at an end of the protrusion opposite an inner surface of the bumper; and the pressure receiving portion extends in a direction intersecting with the protrusion.

11. The sensor assembly of claim 9, wherein the mounting bracket extends along the protrusion.

12. The sensor assembly of claim 6, wherein the bumper comprises a bumper reinforcement at a vehicle interior side of the bumper, wherein the bumper reinforcement is the protrusion.

13. The sensor assembly of claim 6, wherein the protrusion exists at plural positions of the bumper, and plural crash sensors are mounted at each protrusion.

14. The sensor assembly of claim 7, wherein the crash sensor is mounted to the protrusion through a mounting bracket.

15. The sensor assembly of claim 14, wherein the mounting bracket comprises a pressure receiving portion located at an end of the protrusion opposite an inner surface of the bumper; and the pressure receiving portion extends in a direction intersecting with the protrusion.

16. The sensor assembly of claim 14, wherein the mounting bracket extends along the protrusion.

17. The sensor assembly of claim 7, wherein the bumper comprises a bumper reinforcement at a vehicle interior side of the bumper, wherein the bumper reinforcement is the protrusion.

18. The sensor assembly of claim 7, wherein the protrusion exists at plural positions of the bumper, and plural crash sensors are mounted at each protrusion.

19. The sensor assembly of claim 1, wherein the bumper cover comprises a through hole defined by a wall portion, and the protrusion is a part of the wall of the through hole.

20. The sensor assembly of claim 1, wherein the bumper cover comprises a lower edge wall extending toward the rear side of the vehicle so as to fix a radiator grill, and the protrusion is the lower edge wall.

* * * * *